(12) United States Patent
Reynolds, Jr.

(10) Patent No.: US 6,596,121 B1
(45) Date of Patent: Jul. 22, 2003

(54) METHOD OF MAKING COMPOSITE LINER FOR OILFIELD TUBULAR GOODS

(75) Inventor: Harris A. Reynolds, Jr., Houston, TX (US)

(73) Assignee: Hydril Company, Houston, TX (US)

(*) Notice: Subject to any disclaimer, the term of this patent is extended or adjusted under 35 U.S.C. 154(b) by 0 days.

(21) Appl. No.: 09/434,053

(22) Filed: Nov. 4, 1999

(51) Int. Cl.$^7$ .............................................. B32B 31/00
(52) U.S. Cl. .......................... 156/294; 156/71; 156/95; 156/287; 138/97; 264/36.16; 264/36.17; 264/516; 405/184.2
(58) Field of Search .............................. 156/71, 94–95, 156/156, 158, 285–287, 293, 296, 303.1, 294, 312, 544; 138/97–98; 264/36.16, 36.17, 269, 516, 523, 529, 532, 270; 405/184.1, 184.2

(56) References Cited

U.S. PATENT DOCUMENTS

| | | | | |
|---|---|---|---|---|
| 3,461,505 A | * | 8/1969 | Schroeder et al. .......... | 425/392 |
| 3,593,391 A | | 7/1971 | Routh | |
| 3,758,361 A | * | 9/1973 | Hunter ....................... | 156/287 |
| 3,996,967 A | * | 12/1976 | Takada ........................ | 138/97 |
| 4,009,063 A | | 2/1977 | Wood | |
| RE30,929 E | * | 5/1982 | Maimets ..................... | 405/150 |
| 4,365,404 A | * | 12/1982 | Castro et al. .............. | 29/455.1 |
| 4,382,421 A | | 5/1983 | Warren et al. | |
| 4,543,366 A | | 9/1985 | Smith | |
| 4,668,534 A | | 5/1987 | Gray | |
| 4,704,028 A | * | 11/1987 | Richards, Sr. ................ | 355/92 |
| 4,856,356 A | | 8/1989 | Gartner | |
| 4,872,253 A | | 10/1989 | Carstensen | |
| 4,882,830 A | | 11/1989 | Carstensen | |
| 4,893,658 A | | 1/1990 | Kimura et al. | |
| 4,997,613 A | * | 3/1991 | McMillan .................. | 264/229 |
| 5,002,438 A | | 3/1991 | Strong | |
| 5,017,258 A | | 5/1991 | Brown et al. | |
| 5,094,795 A | | 3/1992 | McMillan et al. | |
| 5,168,682 A | | 12/1992 | Rye | |
| 5,176,869 A | | 1/1993 | Okamoto et al. | |
| 5,199,463 A | * | 4/1993 | Lippiatt ....................... | 138/93 |
| 5,275,209 A | | 1/1994 | Sugier et al. | |
| 5,306,449 A | | 4/1994 | Brittain et al. | |
| 5,308,423 A | | 5/1994 | Kauffman | |

(List continued on next page.)

FOREIGN PATENT DOCUMENTS

WO    WO 98/26919    *  6/1998  ........... B29C/63/34

OTHER PUBLICATIONS

Mack et al., "How in situ expansion affects casing and tubing properties", World Oil, Jul. 1999, pps. 69–71.

Primary Examiner—Michael W. Ball
Assistant Examiner—Jessica Rossi
(74) Attorney, Agent, or Firm—Rosenthal & Osha L.L.P.

(57) ABSTRACT

A method for making a composite lined tube is disclosed, wherein the tube has end couplings on it. The method includes pressing a resin impregnated fiber preform progressively along an inner wall of the tube. In one embodiment, the method includes inserting an inflatable bladder into the tube. The bladder is adapted to inflate along a length thereof on application of increasing pressure to the interior of the bladder. The bladder has disposed on its exterior surface the fiber preform impregnated with resin which is adapted to fit within the tube. One end of the preform is secured to one end of the tube. The bladder is then inflated along its length by applying increasing pressure to the bladder. The preform is clamped to a shoulder of one of the couplings at another end of the tube, and the end of the preform is trimmed to conform to the shoulder. Pressure is maintained in the bladder while curing the resin. In one particular embodiment, the bladder is inflated from its center outwardly to its ends. In another particular embodiment, the bladder is inflated at one end progressively towards the other end. In a particular embodiment, the resin curing is assisted by inductively heating the tube.

6 Claims, 9 Drawing Sheets

U.S. PATENT DOCUMENTS

| | | |
|---|---|---|
| 5,320,388 A | 6/1994 | Lacy et al. |
| 5,368,669 A | 11/1994 | Maine et al. |
| 5,368,670 A | 11/1994 | Kauffman |
| 5,406,984 A | 4/1995 | Sugier et al. |
| 5,451,351 A | 9/1995 | Blackmore |
| 5,462,706 A | 10/1995 | McMillan et al. |
| 5,470,111 A | 11/1995 | Nelson et al. |
| 5,494,106 A | 2/1996 | Gueguen et al. |
| 5,593,536 A | 1/1997 | Kaiser |
| 5,626,700 A | 5/1997 | Kaiser |
| 5,861,116 A | 1/1999 | Mandich |
| 5,876,553 A | 3/1999 | Kaiser |
| 5,895,079 A | 4/1999 | Carstensen et al. |
| 5,936,022 A | 8/1999 | Freeman |
| 5,964,981 A | 10/1999 | Nelson et al. ............... 156/423 |

* cited by examiner

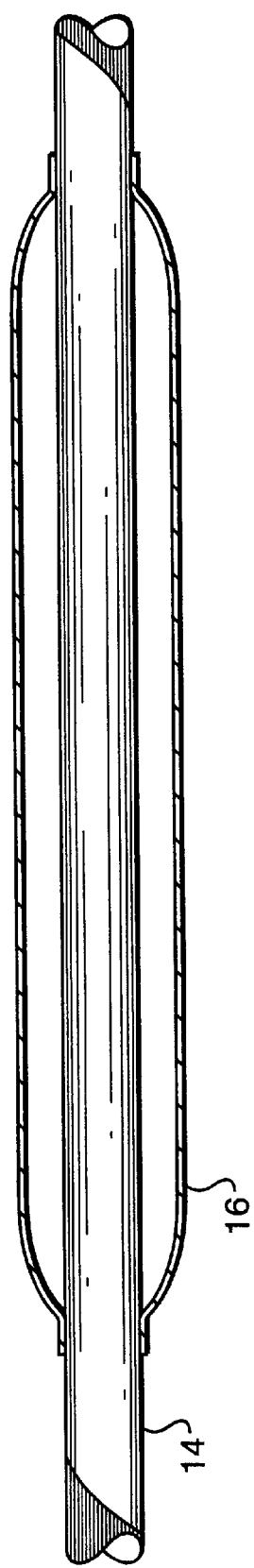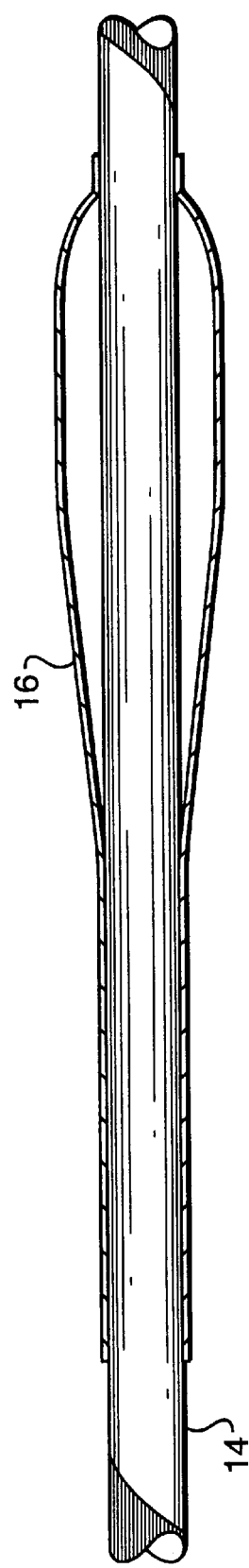

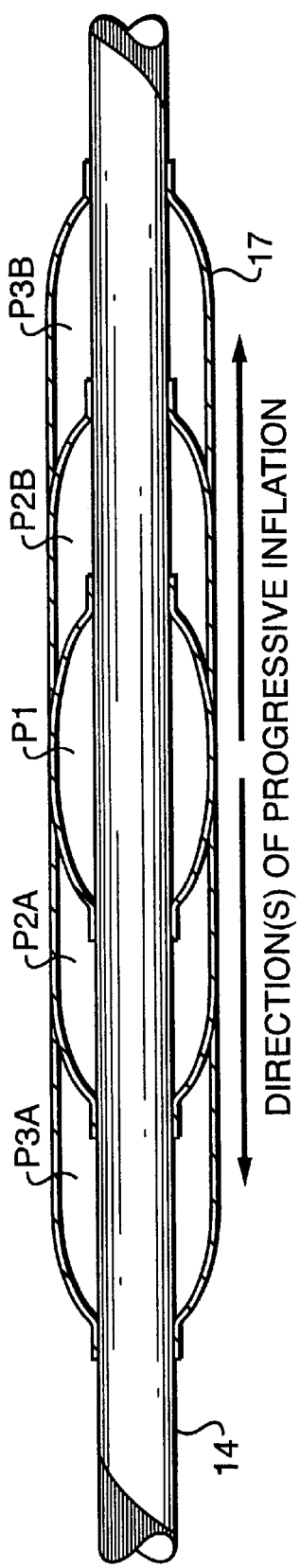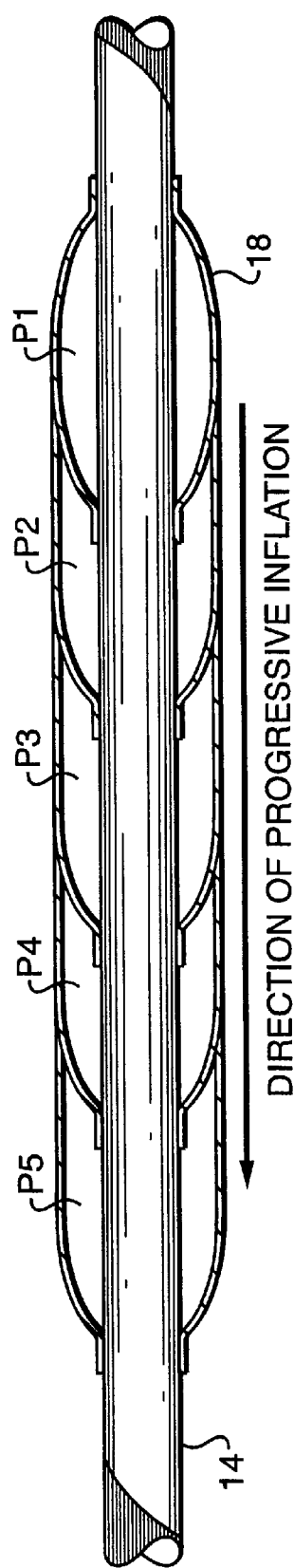

METHOD OF MAKING COMPOSITE LINER FOR OILFIELD TUBULAR GOODS

BACKGROUND OF THE INVENTION

1. Field of the Invention

The invention generally relates to fiber-reinforced composite conduits or tubes and methods for making such conduits or tubes. More particularly, the invention is related to composite pipe liner for oilfield tubular goods which have improved corrosion resistance, and methods for making such lined tubular goods.

2. Description of the Related Art

Oilfield tubular goods are threaded segments or "joints" of seamless pipes made from steel and are used in oil and gaswell extraction and injection applications among other applications. Oilfield tubular goods are often exposed to fluids which cause corrosion. It is known in the art to try to control this corrosion by making the tubular joints from corrosion-resistant alloy ("CRA"), such as stainless steels or nickel-based alloys, or by adding corrosion-inhibiting chemicals to the fluid stream , or by lining the exposed inner surfaces of the tubular joints with a corrosion-resistant lining or coating.

Practical corrosion-resistant tubular joint linings known in the art are generally of three types: (1) thin, unreinforced thermoplastic or thermoset plastic coatings, deposited by spraying or other methods on the inner wall of the tube; (2) inserted (such as by pressing) thermoplastic liners; or (3) inserted, fiber-reinforced composite tube liners.

U.S. Pat. No. 4,382,421 issued to Warren et al discloses a typical apparatus for applying a thin (20–23 micrometers), unreinforced epoxy coating to the interior of a tube to prevent corrosion. Thin, unreinforced coatings of this type can have poor durability, particularly when the tubes are handled roughly in transportation or during installation, or when they are used in applications where the fluid flowing through the tube causes erosion, or when tools or instrument are run through the inside of the tubes during service operations.

U.S. Pat. No. 5,306,449 issued Brittain et al, U.S. Pat. No. 5,320,388 issued to Lacy, et al and U.S. Pat. No. 5,861,116 issued to Mandich disclose methods for inserting extruded, rigid, self-supporting thermoplastic tubes as corrosion-resistant liners for oilfield tubular goods. Typical thermoplastic liners, such as high-density polyethylene ("HDPE") or nylon 11, are limited to working temperatures below about 220 degrees Fahrenheit. So-called engineering thermoplastics, such as those known by their acronyms PVDF, PEEK, or PTFE, which generally have higher working temperatures, generally have been too expensive to be practical as oilfield tubular liners. In order to survive the insertion process, thermoplastic liners are relatively thick (typically about 10–20% of the inner radius of the tube in which they are installed), so they significantly reduce the flow area of the tube in which they are installed. Prior art inserted thermoplastic liners are typically not bonded to the inner diameter of the tube. This means that inserted liners are susceptible to collapse if a vacuum develops inside the tube, or if pressurized fluid in the tube permeates the liner and the internal pressure within the tube is subsequently reduced. Furthermore, unbonded thermoplastic liners cannot be used with threaded tubular end connections fitted with metal-to-metal seals, because these threaded connections require a thin bonded liner which confoms to the movement of the metal-to-metal seal area.

U.S. Pat. No. 3,593,391 issued to Routh discloses an apparatus for lining oilfield tubular goods with a rigid PVC plastic tube, which is then grouted in place inside the oilfield tube with a cement slurry. Lined oilfield tubular goods of this type are available commercially from Rice Engineering, Odessa, Texas. In addition to the grouted PVC liner as described in the Routh '391 patent, there is also available from Rice Engineering fiberglass filament-wound (reinforced) liners for higher-temperature and more-corrosive applications.

Just as is the case for thermoplastic liners, grouted rigid liners of the type described in the Routh '391 patent significantly reduce the internal flow area of the tubes in which they are installed. Furthermore, while thermoplastic liners can be molded around the ends of the tubular joint to seal the ends against corrosion, grouted rigid liners are generally truncated at the end of the tube joint, and are fitted with a seal ring which intrudes into the bore of the tubular joint. Still further, grouted rigid liners are not generally flexible enough to be used successfully with most so-called "premium" oilfield threaded end connections which have integral metal-to-metal seals.

There are also several prior-art methods available to line continuous pipelines, such as sewer pipes or gas distribution lines, with tubular composite liners. One method of sewer-pipe lining is described by U.S. Pat. No. 4,009,063 issued to Wood, which describes a technique for lining a passageway with a resin-impregnated tubular fibrous felt encased in inner and outer impervious linings. This laminated felt tube or "sock" is inserted into a passageway, typically a deteriorated sewer line, and simultaneously inflated and cured-in-place by injected hot water. Techniques of the type described in the Wood '063 patent yield a thick, resin-rich lining with integrated impervious linings, suitable for lining continuous, relatively low-pressure pipelines. They are not particularly suitable for oilfield tubular goods because they can reduce the flow area of the tube joint too much, and there is generally little adhesion to the surrounding pipe. Furthermore, the resin-rich composite lacks the mechanical strength required for oilfield tubular service, and there is no provision for properly terminating the liner at a tube end connection.

U.S. Pat. No. 5,451,351 issued to Blackmore describes a method for rehabilitating sewer pipe which uses a resin-impregnated woven graphite and polyester fiber liner which is expanded into shape by an internal polyurethane bladder. The liner is cured in place by heating resulting from an electrical current passed through the graphite fibers. During the curing process, the composite is bound on its outer layer to the inner wall of the pipe line section, and on its inner surface to the bladder. While this process will yield a relatively thin composite liner, it is not practical for use in lining conductive pipes, such as oilfield tubular goods, because the electrical current used to cure the composite liner will preferentially flow through the steel pipe being lined. Because the polyurethane bladder is left in situ, this method is not particularly suitable for applications exposed to oilfield chemicals. Finally, this process does not provide a means of terminating the liner at a threaded end connection.

SUMMARY OF THE INVENTION

One aspect of the invention is a method for making a composite lined tube. The tube includes end couplings. The method includes inserting into the tube a fiber preform impregnated with resin and adapted to fit within the tube.

The preform is secured to the inner wall of the tube at a selected axial position. The preform is then pressed against an inner wall of said tube progressively along a length of the tube. The preform is clamped to a shoulder on each of the couplings at each end of the tube, and the preform is trimmed to conform to the shoulder. Contact is maintained between the preform and the wall of said tube while curing the resin. In one embodiment, the method includes inserting an inflatable bladder into the tube, the bladder having the resin-impregnated preform on its outer surface. The bladder is adapted to inflate progressively along the length thererof by applying increasing pressure to the bladder. In one embodiment, the joint is inductively heated while pressure is maintained on the bladder to assist curing the resin.

Another aspect of the invention is a composite lined tube. According to this aspect of the invention, the tube includes a metallic tube joint having couplings on each end and a resin impregnated fiber preform liner impressed onto an inner wall of the tube joint and formed to conform with a shoulder of each of the couplings. In one embodiment, the preform is a woven glass fiber tube. In one embodiment, the resin is a toughened amine-cure epoxy. In a particular embodiment, the tube includes a connector adapted to joint to one of the end couplings. The connector includes a seal adapted to mate with the formed end of the liner on the shoulder of the end connector to protect the inner surface of the connector. In one embodiment of the tube, the resin-impregnated preform is impressed onto the interior wall of the tube to a pressure which results in voids less than about 3 percent, and more preferably less than about 1 percent of the volumes.

Another aspect of the invention is a system for forming a composite lined tube. The system includes an impresser adapted to press a resin impregnated fiber preform progressively along an interior wall of the tube, a coupling mask adapted to cover an end connector on the tube and adapted to be positioned flush with a shoulder of the end connector, and an end mold adapted to form an end of a fiber preform to conform to the end couplings. In one embodiment, the impresser includes a progressively inflatable bladder. The bladder is adapted to inflate progressively along its length by application of increasing pressure to the bladder. In one specific embodiment, the bladder inflates from its center outward. In another specific embodiment, the bladder inflates from one end to the other. In a specific embodiment, the bladder includes elastomer having durometer values related to the position along the length thereof to enable progressive inflation. In another specific embodiment, the bladder includes a plurality of internal chambers each adapted to inflate at a different selected pressure. One embodiment of the multi-chamber bladder includes an elastomer for each chamber having a durometer value different from the other chambers. Another embodiment of the multi-chamber bladder includes coupling each chamber to a pressure source through a relief valve having a different selected pressure than the other relief valves.

BRIEF DESCRIPTION OF THE DRAWINGS

FIG. 2 shows a one-chamber inflatable mandrel in the inflated condition.

FIG. 3 shows a one-chamber progressively-inflatable mandrel in a partially-inflated condition.

FIG. 4 shows one example of a multiple-chamber center-outward progressively-inflatable mandrel in the inflated condition.

FIG. 5 shows one example of a multiple-chamber end-to-end progressively-inflatable mandrel in the inflated condition.

DETAILED DESCRIPTION

Figure 1:
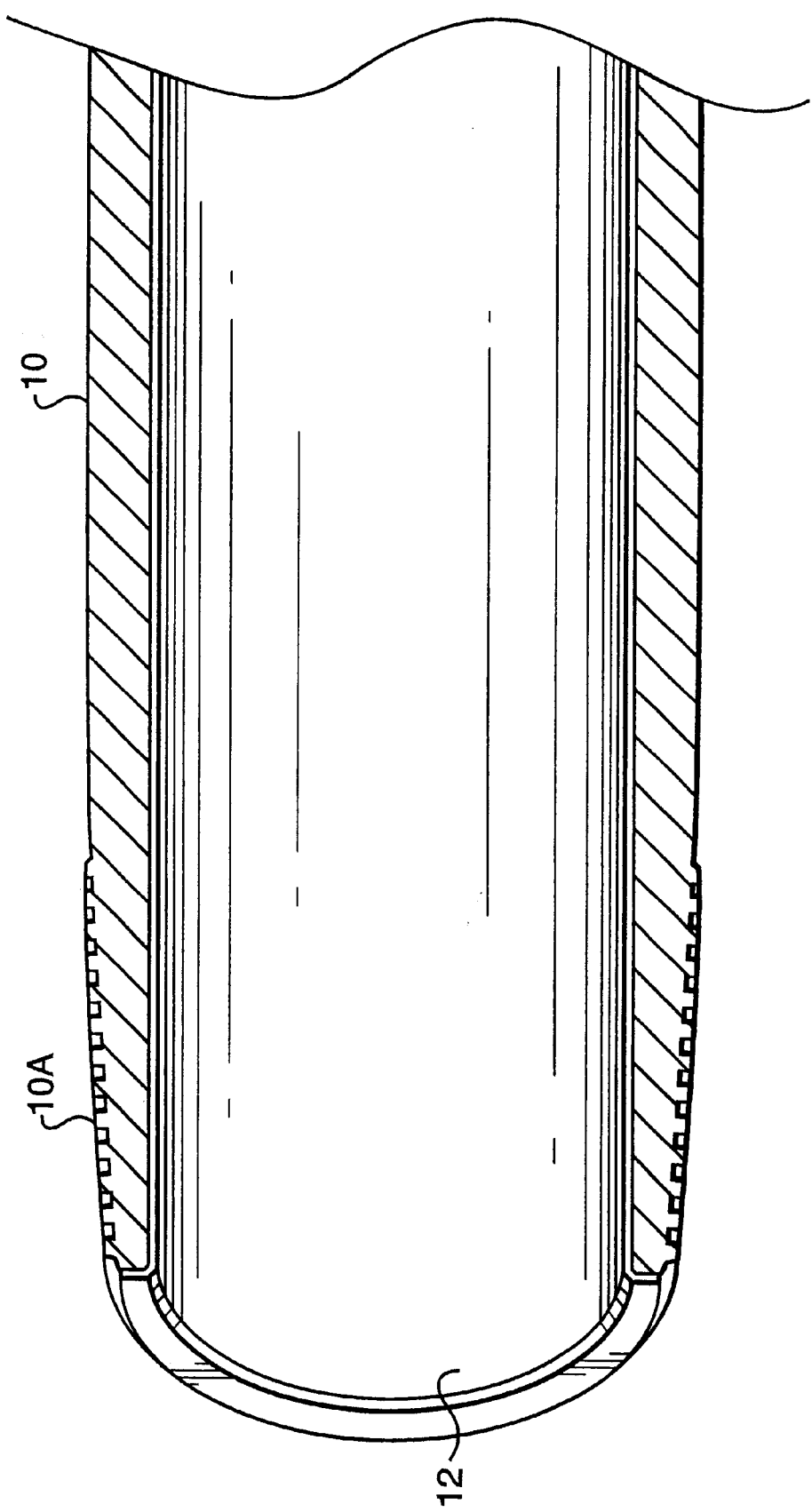
FIG. 1 is a perspective illustration of one embodiment of the oilfield pipe liner of the invention.

A preferred embodiment for a composite liner of the invention includes a fiber "preform". The fiber can be glass, aramid, carbon/graphite or combinations thereof. The fiber can be woven or can be in the form of a needlefelt such as a product made by Textech, N. Monmouth, Me. Generally the preform is in the shape of a tube. The preform is impregnated with a resin such as high-ductility amine-cured epoxy. The resin-impregnated preform is impressed onto the inner wall of a joint of oilfield pipe such as casing or tubing, is formed and bonded to the ends of the joint and is then cured in place on the inner surfaces of the joint of oilfield pipe, such as tubing or casing.

The preferred embodiment of the composite liner will provide excellent resistance to oilfield chemicals, good performance in hot/wet environments prevalent in oilfield applications, and high working temperatures. The composite liner will have low void content, preferably less than about 3%, as voids in a composite liner are analogous to "holidays" in standard oilfield tubular coatings.

Braided fiber preform is superior to other tubular composite fiber preforms (such as sew felt or mat tubes) for use as a tube joint liner because it is easily radially deformable, is relatively inexpensive, and is available in very long continuous lengths which do not require additional processing. Braided preform can also be easily custom-tailored to the particular tube lining application by selecting the weight of the tows (measured in "yield", or length per unit weight of the fiber) used to manufacture the preform, the number of tows in the braid, and the nominal diameter of the braid. The nominal diameter of a tubular braided preform is the diameter at which the individual fibers in the braid rest at 45 degrees with respect to each another. The nominal diameter of the braided preform should be reasonably close to the inside diameter of the tubular joint to be lined, because the diameter of the preform will change most quickly for a given axial displacement at angles in the region of 45 degrees.

Based on experimentation, the preferred yield of the tows used to manufacture the braid should result in a finished liner thickness generally in the range of 0.010 inches (0.254 mm) to 0.040 inches (0.102 mm), and ideally should be within the range of 0.020 inches (0.508 mm) to 0.030 inches (0.076 mm) thick. For example, a 2⅞" 6.4 pound-per-foot joint of oilfield tubing, which has a nominal inside diameter of 2.441 inches (62.00 mm), should be lined by a medium-weight braided fiberglass preform having a nominal diameter of about 2½inches (63.5 mm), a nominal yield of about 8 feet per pound, and a nominal weight of about 28 ounces per square yard. This will result in a liner about 0.025 0.026" thick after processing according to the method of the invention. Braided fiberglass preform of a type which will work with the invention is available from A & P Technology, Covington, Ky.

A preferred resin is a toughened amine-cure epoxy resin. The properties of the resin which make a selected resin more suitable for use with the invention include resistance to hot/wet environments required in oilfield applications, and high working temperatures. The preferred resin will have high elongation (above 3% maximum elongation) and a high degree of toughness, in order to survive the deflections (bending and shock) of oilfield tubular joints encountered in normal service. Finally, the preferred resin will have excellent adhesion (bond strength) to the steel used in most oilfield tubular joints. High elongation and bond strength to steel are particularly important for bonding of the liner to threaded end connections which have metal-to-metal seals, due to the deflections near the seal area. A number of amine-cured epoxies of the preferred type are available from the range of epoxies sold under the trade name EPON by Shell Chemicals, Houston, Tex.

The braided fiberglass preform is impregnated with the epoxy resin by any conventional means, including but not limited to conventional resin baths, before the preform is inserted into the oilfield tubular joint to be lined. The preferred fiber-to-resin ratio should be approximately 50% fiber and 50% resin, by volume, in the cured state. Referring to FIG. 1, a joint of oilfield tube, such as production tubing is shown at its end, at 10. The joint 10 in FIG. 1 includes a threaded coupling 10A at its end, but as will be further explained, the invention is not limited to threadedly coupled joints. The liner is shown at 12 generally bonded to the inner wall of the joint 10, and formed onto the shoulder of the threaded coupling 10A.

The method of the invention includes impressing the resin-impregnated preform against the inner wall of the tube progressively along the length of the tube. A preferred embodiment of the method to make the liner of the invention uses a progressively inflatable bladder, which for convenience of handling can be disposed on a rigid mandrel. The method of the invention also uses concentrically arranged end molds to conform the resin-impregnated preform to the ends of the tube joint. When gradually increasing air pressure is introduced to the inflatable bladder, through the mandrel, the bladder inflates radially, in an axially progressive fashion, either from one end to the other, or from the center of the bladder outward toward both ends of the bladder.

Referring to FIGS. 2 and 3, a hollow, rigid internal mandrel 14 is preferably in the form of a tube made of material such as aluminum, having the appropriate diameter and having pressure-tight plugs (not shown) or the like installed in its ends which are capable of holding the required fluid or gas pressure within the mandrel 14. Aluminum is preferred as a mandrel material for its light weight, temperature resistance and strength. The diameter of the mandrel 14 is preferably about 50 to 75 percent of the internal diameter of the tube joint to be coated. For example, a 2⅞", 6.4 pound-per-foot oilfield tubular joint with an internal diameter of 2.444 inches (62.00 mm) would preferably use a mandrel of about 1.5 inches (38.1 mm) outside diameter. An inflatable bladder 16 made from temperature resistant elastomer is preferably bonded to the mandrel 14 in the desired areas with any one of a number of epoxy-based elastomer adhesives known in the art. In the areas where the bladder 16 is to be allowed to inflate, the mandrel 14 is preferably treated with a release compound. At the ends where the bladder 16 is bonded to the mandrel 14, an epoxy-based primer and adhesive should be used.

A progressively-inflatable bladder 16 can be in the form of a single internal pressure chamber as shown in FIGS. 2 and 3, or in the form of multiple internal chambers, as shown in FIGS. 4 and 5. Both types of bladders (single or multi-chamber) are preferably designed to be inflated with compressed gas such as air or nitrogen to a pressure of about 60 to 100 pounds per square inch (psi). This pressure range has been found experimentally to result in a composite liner with minimum void content, and is well within the capability of standard air compression systems. Irrespective of the type of bladder used, the bladder (16 in FIG. 2) inflates progressively along its length as the internal pressure is increased. For the single chamber bladder 16 shown in FIGS. 2 and 3, progressive axial inflation can be obtained, in one example, by having the bladder material thickness be related to the axial position along the bladder 16, or alternatively by selecting a material hardness or elasticity ("durometer") which is related to the axial position along the length of the bladder 16. Selective inflation in multi chamber bladders will be further explained.

Referring again to FIGS. 2 and 3, the single chamber bladder 16 having varying material thickness to facilitate progressive inflation can be made, for example, by wrapping strips of uncured layers of rubber, preferably on the bias, to control modulus along the length of the bladder 16. The uncured rubber is then wrapped with polyester shrink-wrap tape and cured at the appropriate temperature. The bladder 16 of this embodiment of the invention is preferentially fabricated of a peroxide-cured elastomer chosen for the ability to withstand the normally high cure temperatures of the preferred composite resins, typically 250–350 degrees F. Preferred bladder materials include hydrogenated nitriles, silicone rubber, and an elastomer made by E. I. duPont de Nemours & Co. sold under the trade name Viton.

In one embodiment, a single-chamber bladder for lining a 2⅞" nominal diameter joint can be made from 80 durometer (Shore A) hydrogenated nitrile rubber (HNBR) strips about 0.020" thick, wound in a series of helical patterns, to yield a bladder which varies in thickness from about 0.030" to about 0.120" thick along its length. Alternately, strips of uncured rubber of varying durometer can be used to produce the same result, with lower durometer rubber positioned where the bladder must inflate first. It will be appreciated by those skilled in the art that many different combinations of bladder wall thickness, durometer value of the material, and amounts and types of bladder wall reinforcement can be used to achieve the desired effect of progressive axial inflation of the bladder 16.

A multiple-chamber, progressively inflatable bladder can have substantially contiguous chambers which are progressively inflated in the desired axial direction. Referring to FIG. 4, the chambers in the bladder 17 are shown at P1 for the chamber which will inflate at the lowest pressure, at P2A and P2B for the chambers which will inflate next. In the embodiment shown in FIG. 3, successively inflating chambers inflate in a direction axially outward from the center chamber P1 of the bladder 17, until at the ends of the bladder 17, chambers P3A and P3B inflate last at the highest pressure. Referring to FIG. 5, a bladder 18 which progressively inflates in one direction along the length thereof includes chambers P1 through P5 which inflate at progressively higher pressures. The multiple-chamber bladders of the types shown in FIGS. 3 and 4 can be simply fabricated with wide strips of uncured elastomer wound circularly over the rigid mandrel 14, similar to the method for fabricating a single chamber bladder. However, in the case of a multiple-chamber bladder, the "primary" or first-inflated chamber (P1 in FIGS. 4 and 5) is wound first. Then, in this example, a release compound is applied to the areas on the outside of the primary chamber P1 where it is desired that the first and second (P2 and P2A, P2B) chambers do not bond together during cure. Finally, the second chamber (or chambers—depending on whether the style of bladder in FIG. 4 or FIG. 5 is being made) are wound over the first chamber P1. This sequence is repeated for all of the successive chambers in the bladder (17 in FIGS. 4 and 18 in FIG. 5), and the entire bladder is then cured at one time, just as for the single-chamber bladder (16 in FIGS. 2 and 3). It should be clearly understood that the number of chambers in the progressively inflatable bladders as shown in FIGS. 3 and 4 are not meant to limit the invention. Depending on many factors which will be further explained, including the diameter of the joint which is to be lined according to the invention, more or fewer chambers may be used in any particular bladder.

Progressive axial inflation of the bladder serves two important functions: First, it radially distends the resin-impregnated preform in a gradual fashion along its length, to prevent wrinkling of the preform. Wrinkling has been observed in preform where an inflatable bladder which inflates uniformly along its length is used to compress the preform against the inner wall of a tube Second, progressive inflation serves to push a "wavefront" of excess resin ahead of the contact area between the bladder and the preform, insuring that entrapped air is substantially driven out ahead of the preform as the preform is pushed against the inner wall of the tube. This action is analogous to the use of bubble rollers in conventional hand-layup composite construction, and helps to minimize voids in the cured composite. It has been determined that using the pressure inflated bladder can have the additional benefit of substantially reducing the voids in the resin/fiber preform composite to about 1 percent or less by volume, where the full inflation pressure of the bladder is about 60 to 100 pounds per square inch (413.6 to 689.4 kPa). In one embodiment of the tube, the resin-impregnated preform is impressed onto the interior wall of the tube to a pressure which results in voids less than about 3 percent, and more preferably less than about 1 percent of the volume.

Preferably the pressure passageways from the interior of the mandrel (14 in FIGS. 2 and 3) are provided with some means of preventing the bladder material from extruding into those passages during the process of curing the bladder under the pressure of the shrink-wrap tape, if used. This can be performed in one of several ways, including by using passageway plugs removable from the inside of the mandrel 14, or sintered bronze plugs permanently fitted to the passageways, or by fitting flaps fabricated from shim-stock over the holes during bladder fabrication. The only requirements are that the passageway covers be capable of withstanding the cure temperatures to which they will be exposed, and that they be treated with release compound to insure that the bladder material does not stick to them.

Figure 6:
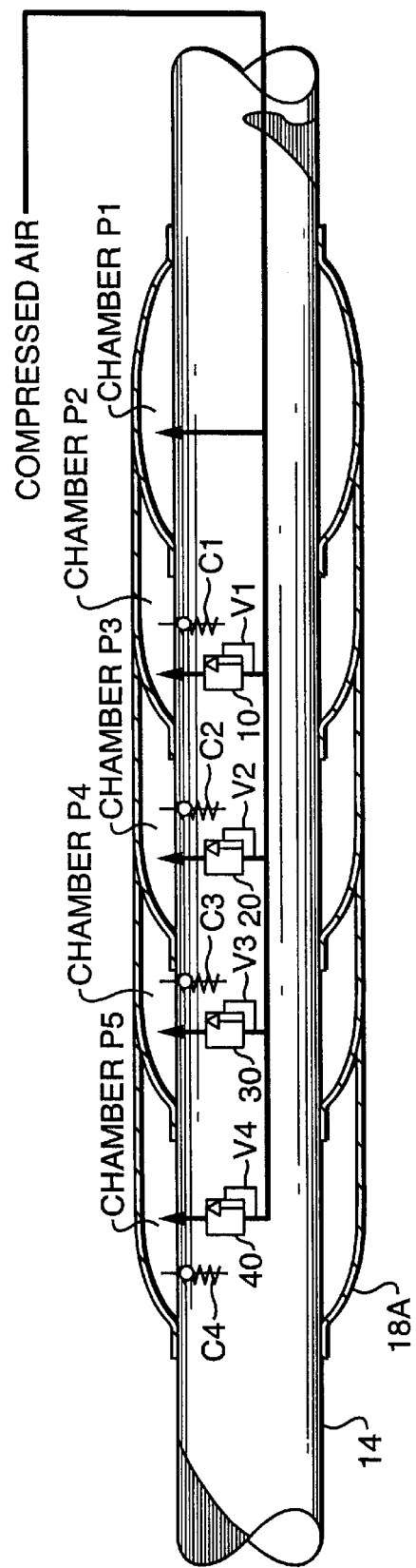
FIG. 6 is a schematic diagram of one example of an end-to-end progressively inflatable mandrel, showing the plumbing of the pre-set pressure relief valves with typical set pressures.

As an alternative to the embodiments shown in FIGS. 4 and 5, each of the multiple chambers can be individually coupled to fluid or gas pressure from inside the mandrel 14, and sequentially inflated from an external fluid pressure manifold to the desired internal pressure. Referring to FIG. 6, alternately, each chamber (P2 through P5) except the primary (first to inflate) chamber P1 can be fitted with a pressure relief valve V1 through V4, respectively and a check valve C1 through C4, respectively, both of conventional design, between the inside of the mandrel 14 and the individual bladder chambers P2–P5. The relief valves V1–V4 are preferentially set to open at progressively higher pressures to cause the bladder 18A to progressively inflate in the desired axial direction. The check valves C1–C4 are provided to relieve pressure from the relief-valve equipped bladder chambers during deflation of the bladder 18A.

When pressure in the mandrel 14 is removed after the composite liner is cured, the check valves C1–C4, which are fitted in parallel with the pressure relief valves V1–V4 will open and allow the accumulated pressure in the bladder chambers P2–P5 to be relieved into the mandrel 14. As for the previous embodiments of multi-chamber bladder, the number of chambers for the embodiment shown in FIG. 6 is not meant to limit the invention.

Oilfield tubular joints (such as shown at 10 in FIG. 1) are most commonly available in specific lengths such as defined in Range 2 or Range 3, as published by the American Petroleum Institute (API), Washington, D.C. Experiments with various bladder configurations demonstrate that each chamber in a multiple-chamber mandrel is preferably about 3 feet long; thus, a bladder for lining a Range 2 tubular joint would preferably have about 10 chambers. A bladder for lining a Range 3 tubular joint would preferably have about 15 chambers. The settings on the pressure-relief valves (V1–V4 in FIG. 6) will depend on which inflation sequence is used (end-to-end, or center-outwards), the number of chambers, and the maximum inflation pressure desired. For example, a bladder designed for lining API Range 2 joints in a center-outwards inflation sequence would require:

| 1 center chamber | 3 feet long |
| 10 side chambers (5 each side) | 30 feet long |
| Total length | 33 feet long |

The center chamber (such as P1 in FIG. 4) will be in pressure communication with the inside of the mandrel 14. For the 5 pressure-relief stages (for the 5 chambers on each side), and a maximum inflation pressure of 100 psi, the relief valves would be set at 20, 40, 60, 80 and 100 psi respectively for the chambers on either side of the center chamber.

Single-chamber mandrels have the advantages that they are generally cheaper and easier to fabricate, and do not require pressure relief valves or multiple air lines. However, it will be appreciated that the displacement of multiple-chamber mandrels is more easily controlled.

Figure 7:
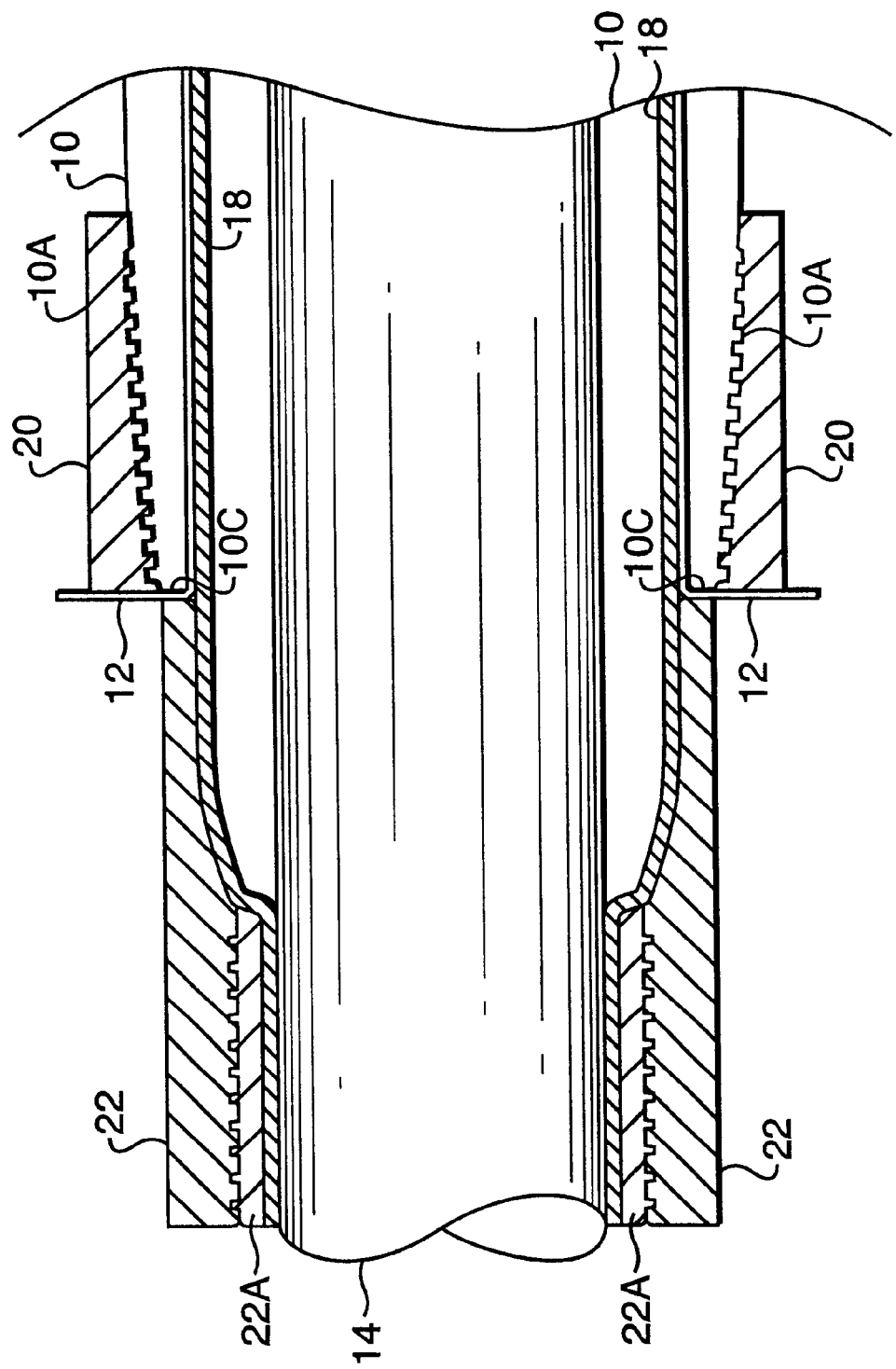
FIG. 7 shows a cross-section at the end of the inflatable mandrel during the end-forming process on a threaded pin connection.
Figure 7A:
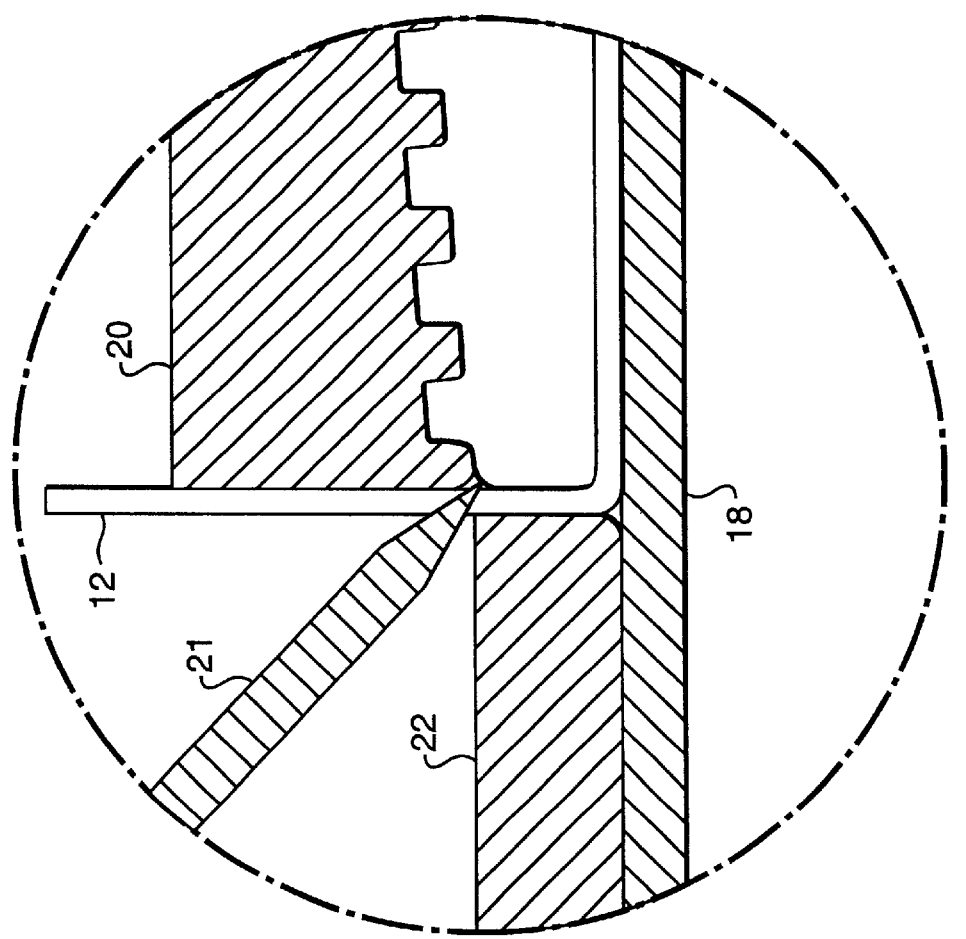
FIG. 7A shows a detailed view of a composite trimming area between an end mold and a thread mask.
Figure 7B:
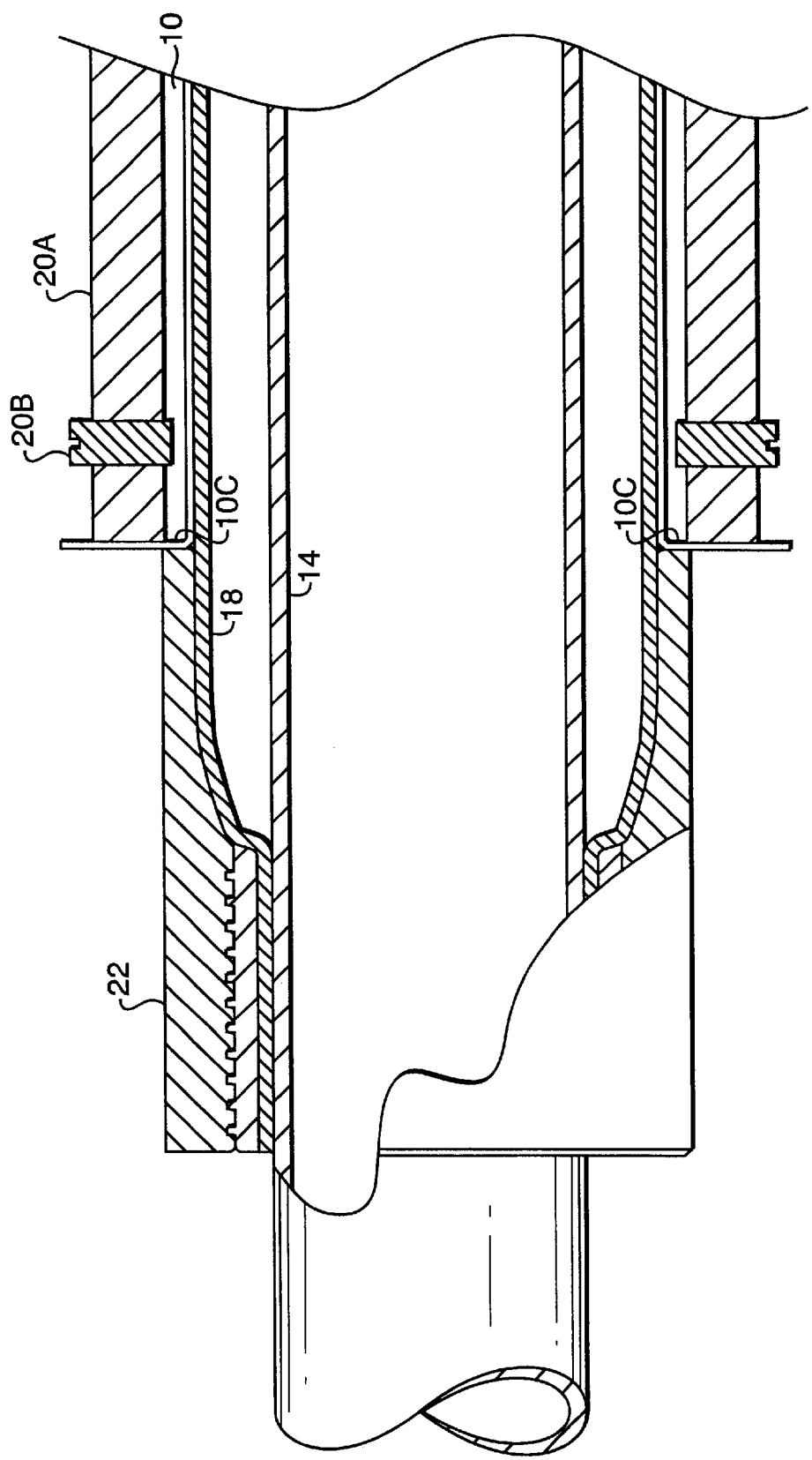
FIG. 7B shows cross-section at the end of the inflatable mandrel during the end-forming process on a grooved end connection.

Referring to FIG. 7, in one embodiment of the method to make the liner 12 of the invention, an oilfield tubular joint 10 with threaded connections 10A is first internally cleaned by sand-blasting and washing with an organic solvent such as methyl ethyl ketone ("MEK") after the threaded connections 10A have been cut or formed on both ends of the joint 10, but before a box coupling (female threads—not shown FIG. 7) has been installed on one end of the joint 10. This internal cleaning step is to insure proper bonding of the composite liner 12 to the inner wall of the tubular joint 10. The threaded connections 10A on the tubular joint 10 are then covered with an end connection or thread mask 20, prefereably made from anodized aluminum or the like and coated with a release compound. In this embodiment, the thread mask 20 is positioned on the threaded connection 10A end so that the shoulder of the mask 20 is precisely flush with the shoulder 10C of threaded connection 10A. Alternatively, as shown in FIG. 7B, where the joint 10 includes a non-threaded type of end connection to be masked, it may be desirable to equip the mask 20A with a radial locking screw 20B to insure that the mask stays precisely positioned flush with the shoulder 10C. The appropriate length of the preform is then impregnated with resin (note that pre-impregnated preform, known as "prepreg" may also be used) and slipped over the mandrel 14 having the bladder 18 thereon. The inflatable bladder 18 and preform are inserted into the tubular joint 10.

Referring again to FIG. 7, pressure is applied to the mandrel 14 to a few psi to inflate the bladder 18 in the center of thereof, or at one end thereof depending on the style of bladder used. This will radially center the bladder 18 inside the tubular joint 10. Both ends of the bladder 18 are then centered with respect to the tubular joint 10 and are held in place. An end mold 22 is then inserted into the braided tubular preform and screwed loosely onto the end of a mold guide shoe 22A. Thus, when the braided preform is drawn into the tubular joint 10 as it is radially distended by the inflatable bladder 18, it will slightly drag over the end mold 22, maintaining a slight axial tension on the preform to avoid wrinkling of the preform. The air pressure in the bladder 18 is then increased to progressively inflate the bladder 18 from the center outwards towards both ends (or axially along the bladder 18 if the form of bladder shown in FIG. 5 is used). This should be done gradually, to allow any excess resin in the preform to progress slowly along the inner wall of the joint 10. For typical resins having viscosity in the range of about 500–1000 centipoise, used with a center-outwards inflating bladder 18 (as in FIG. 5), it has been determined that the inflation process for applying the liner to an API Range 2 tube joint should take about 2–4 minutes. The sound of the pressure relief valves opening and filling the bladder chambers in sequence will be clearly audible, and should be checked periodically against the observed inflation pressure.

Just before inflation of the last bladder chambers at each end of the bladder 18, the end of the liner preform braid is splayed out and away from the end of the tubular joint 10, and any wrinkles can be smoothed-out manually. This may result in the braided preform becoming unraveled at the cut end, but as long as this occurs at some lateral distance outward from the shoulder 10C of the end connection 10A, it is acceptable. If the preform unravels down to the pin end during the splaying process, a "finer" braid may be required, that is, one with a larger number of smaller (higher yield) fiber tows.

End molds 22 are then screwed further onto the end-mold guide shoes 22A until they press the splayed-out preform against the shoulder 10C of the end connection 10A. Care should be taken that the end mold 22 does not push so hard against the shoulder 10C that the mandrel 14 moves inside the tubular joint 10. Note that the end molds 22 also serve the function of containing the inflatable bladder 18. This allows the bladder 18 to be inflated to much higher pressures than would be possible if the bladder was not thus contained. Note further that if the end molds 22 are not installed before the inflation of the last bladder chambers at each end of the mandrel 14, the bladder 18 may expand so much that the end molds 22 would be difficult to install. If the end molds 22 are installed too soon in the process, the braid may not properly distend radially near the ends of the tubular joint 10, and there may be wrinkles in the liner or gaps between the liner and the joint 10.

After the bladder 18 is completely inflated to the required pressure and the end mold 22 is secured against the shoulder 10C on the tubular joint 10, the excess braid should be trimmed before curing. FIG. 7A shows how a sharp trimming blade 21 can be inserted into the small gap between the mask 20 and the end mold 22 to trim away the excess braid. If there is any movement of the braid during the trimming operation, the end molds 22 should be checked for tightness against the shoulder 10C.

It can be appreciated by those skilled in the art that while an individual mandrel and bladder can usually be adapted to several nominal sizes and grades of oilfield tubular goods, that the end molds and thread masks must be made specifically for the particular size and type of oilfield end connection. For example, one inflatable mandrel will be adaptable for at least the following oilfield tubular goods:

2⅞" nominal 6.4 ppf seamless plain-end pipe with API 8-round coupled connections 2⅞" nominal 6.5 ppf seamless external upset-end pipe with premium 2-step connections with metal-to-metal seals.

2½" nominal API line pipe (seamless or ERW) with grooved connections such as those made by the Victaulic Corp., Easton, Pa. However, each one of these types of connections will require a different set of connection masks and end molds specifically designed for the contours of the particular end connection. For example, in one preferred embodiment for lining a 2½" nominal joint of line pipe (which is dimensionally the same as 2⅞" nominal downhole pipe) fitted with end connection grooves, the end mold and inflatable mandrel can be essentially the same as those used on a tubular joint having API threaded connections. However, the end connection mask must be adapted for use with the groove-type end connection.

Figure 8:
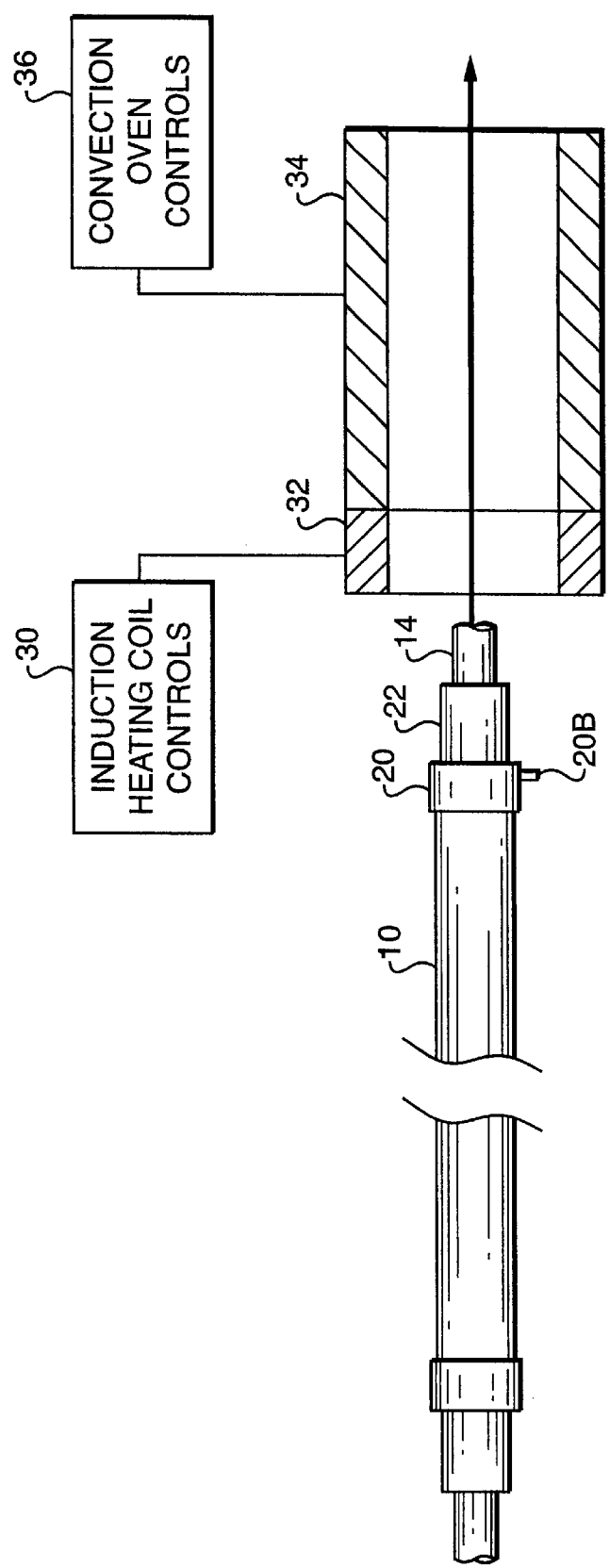
FIG. 8 shows a cross-section at the end of the inflatable mandrel during the end-forming process on a grooved end connection and one example of an inductive heating system to assist in resin curing.

FIG. 8 in the Drawings shows a preferred type of end connection mask for use with grooved-type couplings. Note that the end connection mask 20 is secured to the groove in the coupling with a radial set-screw 20B, preferably made from nylon or ultra-high molecular weight polyethylene (UHMWPE), or other plastics to which epoxy resins will not adhere.

After the inflatable bladder is fully inflated, and the ends of the preform are properly trimmed, the liner (12 in FIG. 1) can be cured inside the tubular joint (10 in FIG. 1). In prior art methods of composite manufacture, this would be accomplished using a convection or radiant heat oven enclosing the entire joint. However, oilfield tubular joints, because they are generally made from steel, are heat-conductive. The mass of the joint 10 is also large relative to the mass of the liner. The tubular joint 10 will thus require a long part of its residence time in an oven just to heat the joint 10 to the proper cure temperature. Since this will at least in part determine the size of the oven required, and therefore the economics of the curing process, a preferred embodiment of a curing system for use with this invention will include a means for bringing the tubular joint 10 to the required cure temperature as quickly as possible. The cure system for the liner in this aspect of the invention includes an induction heating coil 32 through which the tubular joint 10 will pass at a predetermined rate when it enters the curing oven 34 The controls 30 for the induction coil heating system 32 will be able to supply appropriate voltage, current, and frequency values determined by the particular size, weight and grade of oilfield tubular joints to be inductively heated, but will in any case be adapted to raise the temperature of the tubular joints close to the cure temperature of the composite liner. This temperature will, of course, depend on the particular resin selected, but in any event will typically be about 300–325 degrees Fahrenheit. Thus, the residence (or "soak" time) of the tubular joint 10 in the oven will be minimized by means of inductive heating of the joint 10.

Figure 9:
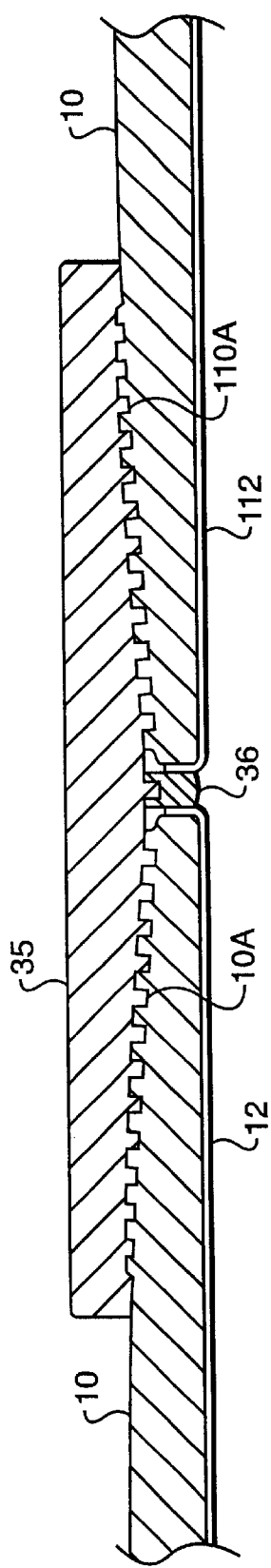
FIG. 9 shows a coupling used for joining tubes having the threaded connections such as shown in FIG. 7

In another aspect of the invention, as shown in FIG. 9, a pin end 10A of one joint 10 made according to the method of the invention can be coupled to the pin end 110A of another joint 110 using a double-box (female) coupling 35, more commonly known as a "collar". The center of the collar 35 includes therein a seal ring 36 such as can be made from PTFE or similar plastic. The seal ring provides a barrier to fluid disposed inside the liner 12, 112 from coming into contact with the unlined threads on the pin ends 10A, 110A and on the collar 35 by sealing against the liner 12, 112, where the liner 12, 112 is formed around the shoulder of the pin ends 10A, 110A. Although the embodiment shown in FIG. 9 is directed to use of the seal ring 35 with threaded connections, a seal ring is equally applicable to other types of joint connections such as those previously described herein.

It will be apparent to those skilled in the art that the foregoing description is only an example of the invention, and that other embodiments of this invention can be readily devised which do not depart from the spirit of the invention as disclosed herein. Accordingly, the scope of the invention shall be limited only by the attached claims.

What is claimed is:

1. A method for making a composite lined tube, said tube comprising end couplings, the method comprising:

inserting into said tube a fiber preform impregnated with a thermoset resin and adapted to fit within said tube;

securing said preform at a selected axial position to an interior wall of said tube;

inserting an end mold into said preform;

pressing said preform against said interior wall of said tube progressively along a length of said tube, such that axial tension is maintained on said preform through contact with said end mold;

clamping, after said pressing, said preform to a shoulder on each of said couplings at each end of said tube, by pressing said end mold against said shoulder;

trimming an end of said preform, therein to conform to said shoulder; and maintaining contact between said preform and said wall of said tube while curing said thermoset resin.

2. The method as defined in claim 1 further comprising inductively heating said tube to assist curing said resin.

3. The method as defined in claim 1 wherein said trimming comprises cutting said preform so as to be substantially flush with an exterior of said shoulder.

4. The method as defined in claim 1 wherein said pressing comprises inserting an inflatable bladder into said tube, said bladder adapted to inflate progressively along a length thereof on application of increasing pressure to said bladder; and inflating said bladder along said length thereof by applying increasing pressure to said bladder.

5. The method as defined in claim 4 wherein said inflating said bladder comprises initiating said inflating approximately in a center of said bladder and continuing said inflation outward from said center of said bladder toward ends of said bladder.

6. The method as defined in claim 4 wherein said inflating said bladder comprises initiating said inflating at one end of said bladder and continuing said inflation towards the other end of said bladder.

\* \* \* \* \*